(12) United States Patent
Baines et al.

(10) Patent No.: US 7,130,936 B1
(45) Date of Patent: Oct. 31, 2006

(54) SYSTEM, METHODS, AND COMPUTER PROGRAM PRODUCT FOR SHARED MEMORY QUEUE

(75) Inventors: Mandeep S. Baines, San Jose, CA (US); Shamit D. Kapadia, San Jose, CA (US); Akash R. Deshpande, San Jose, CA (US)

(73) Assignee: Teja Technologies, Inc., San Jose, CA (US)

( * ) Notice: Subject to any disclaimer, the term of this patent is extended or adjusted under 35 U.S.C. 154(b) by 308 days.

(21) Appl. No.: 10/425,286

(22) Filed: Apr. 28, 2003

Related U.S. Application Data

(60) Provisional application No. 60/433,348, filed on Dec. 12, 2002, provisional application No. 60/432,954, filed on Dec. 11, 2002, provisional application No. 60/432,928, filed on Dec. 11, 2002, provisional application No. 60/432,872, filed on Dec. 11, 2002, provisional application No. 60/432,785, filed on Dec. 11, 2002, provisional application No. 60/432,778, filed on Dec. 11, 2002, provisional application No. 60/432,757, filed on Dec. 11, 2002, provisional application No. 60/376,824, filed on Apr. 29, 2002, provisional application No. 60/359,453, filed on Feb. 22, 2002.

(51) Int. Cl.
*G06F 12/00* (2006.01)

(52) U.S. Cl. .................. 710/53; 711/110; 711/163; 710/52; 710/54; 710/56

(58) Field of Classification Search ............ None
See application file for complete search history.

(56) References Cited

U.S. PATENT DOCUMENTS

| | | | |
|---|---|---|---|
| 4,800,521 A | 1/1989 | Carter et al. | |
| 5,239,634 A * | 8/1993 | Buch et al. | ............. 711/200 |
| 5,247,677 A | 9/1993 | Welland et al. | |
| 5,260,868 A | 11/1993 | Gupta et al. | |
| 5,301,312 A | 4/1994 | Christopher et al. | |
| 5,465,335 A | 11/1995 | Anderson | |
| 5,530,879 A | 6/1996 | Crump et al. | |
| 5,619,409 A | 4/1997 | Schultz et al. | |
| 5,636,124 A | 6/1997 | Rischar et al. | |
| 5,640,563 A | 6/1997 | Carmon | |
| 5,671,446 A * | 9/1997 | Rakity et al. | ............. 710/54 |
| 5,701,481 A | 12/1997 | Hosaka et al. | |
| 5,781,187 A | 7/1998 | Gephardt et al. | |

(Continued)

OTHER PUBLICATIONS

Deshpande, et al., "The Shift Programming Language for Dynamic Networks of Hybrid Automata" *IEEE Transactions on Automatic Control*, Apr. 1998, 43(4): 584-587.

(Continued)

*Primary Examiner*—Mano Padmanabhan
*Assistant Examiner*—Jasmine Song
(74) *Attorney, Agent, or Firm*—Perkins Coie LLP

(57) ABSTRACT

In summary, one aspect of the present invention is directed to a method for a shared memory queue to support communicating between computer processes, such as an enqueuing process and a dequeuing process. A buffer may be allocated including at least one element having a data field and a reserve field, a head pointer and a tail pointer. The enqueuing process may enqueue a communication into the buffer using mutual exclusive access to the element identified by the head pointer. The dequeuing process may dequeue a communication from the buffer using mutual exclusive access to the element identified by the tail pointer. Mutual exclusive access to said head pointer and tail pointer is not required. A system and computer program for a shared memory queue are also disclosed.

26 Claims, 6 Drawing Sheets

U.S. PATENT DOCUMENTS

| | | |
|---|---|---|
| 5,872,909 A | 2/1999 | Wilner et al. |
| 5,938,708 A | 8/1999 | Wallace et al. |
| 5,944,840 A | 8/1999 | Lever |
| 6,035,348 A * | 3/2000 | Webber et al. .................. 710/54 |
| 6,105,048 A | 8/2000 | He |
| 6,279,108 B1 | 8/2001 | Squires et al. |
| 6,341,303 B1 | 1/2002 | Rhee et al. |
| 6,349,321 B1 | 2/2002 | Katayama |
| 6,359,622 B1 | 3/2002 | Hayes-Roth |
| 6,385,637 B1 | 5/2002 | Peters et al. |
| 6,385,638 B1 | 5/2002 | Baker-Harvey |
| 6,425,091 B1 | 7/2002 | Yang et al. |
| 6,438,573 B1 | 8/2002 | Nilsen |
| 6,438,651 B1 * | 8/2002 | Slane .......................... 711/118 |
| 6,510,531 B1 * | 1/2003 | Gibbons ....................... 714/37 |
| 6,779,084 B1 * | 8/2004 | Wolrich et al. .............. 711/118 |

OTHER PUBLICATIONS

Deshpande, et al., "Viable Control of Hybrid Systems", *Hybrid Systems II,* Springer 1995.

Interrupt Driven Task Scheduler for Systems, *IBM Technical Disclosure Bulletin,* Mar. 1992, US.

* cited by examiner

SYSTEM, METHODS, AND COMPUTER PROGRAM PRODUCT FOR SHARED MEMORY QUEUE

CROSS-REFERENCES TO RELATED APPLICATIONS

This application claims benefit of priority under 35 U.S.C. 119(e) and/or 35 U.S.C. 120 to:

U.S. Provisional Patent Application No. 60/359,453, entitled, "SYSTEM, METHOD, OPERATING MODEL AND COMPUTER PROGRAM PRODUCT FOR OPERATING SYSTEM FUNCTIONS FOR NETWORK PROCESSING", filed Feb. 22, 2002, Marco Zandonadi, et al. inventors;

U.S. Provisional Application, No. 60/376,824, entitled, "SYSTEM, METHOD, OPERATING MODEL AND COMPUTER PROGRAM PRODUCT FOR IMPROVING APPLICATION PERFORMANCE UTILIZING NETWORK PROCESSORS", filed Apr. 29, 2002, Mandeep S. Baines, et al., inventors;

U.S. Provisional Patent Application No. 60/432,778, entitled, "SYSTEM, METHOD, AND COMPUTER PROGRAM PRODUCT FOR MEMORY MANAGEMENT", filed Dec. 11, 2002, Marco Zandonadi, et al. inventors;

U.S. Provisional Patent Application No. 60/432,757, entitled, "SYSTEM, METHOD, AND COMPUTER PROGRAM PRODUCT FOR INTERRUPT SCHEDULING IN PROCESSING COMMUNICATION", filed Dec. 11, 2002, Marco Zandonadi, et al. inventors;

U.S. Provisional Patent Application No. 60/432,954, entitled, "SYSTEM, METHOD, AND COMPUTER PROGRAM PRODUCT FOR PROCESSING REFLECTIVE STATE MACHINES", filed Dec. 11, 2002, Marco Zandonadi, et al. inventors;

U.S. Provisional Patent Application No. 60/432,928, entitled, "SYSTEM, METHOD, AND COMPUTER PROGRAM PRODUCT FOR GENERATING AN INTERFACE", filed Dec. 11, 2002, Marco Zandonadi, et al. inventors;

U.S. Provisional Patent Application No. 60/432,872, entitled, "SYSTEM, METHOD, AND COMPUTER PROGRAM PRODUCT FOR TEMPLATE-BASED MULTI-PROTOCOL MESSAGING BETWEEN SYSTEMS", filed Dec. 11, 2002, Marco Zandonadi, et al. inventors;

U.S. Provisional Application, No. 60/432,785, entitled, "SYSTEM, METHOD, AND COMPUTER PROGRAM PRODUCT FOR SHARED MEMORY QUEUE", filed Dec. 11, 2002, Mandeep S. Baines, et al., inventors; and U.S. Provisional Application, No. 60/433,348, entitled, "SYSTEM, METHOD AND COMPUTER PROGRAM PRODUCT", filed Dec. 12, 2002, Akash R. Deshpande, et al., inventors; each of which applications are incorporated by reference herein;

Other related United States patent applications are co-pending U.S. patent application Ser. No. 10/371,830, entitled, "SYSTEM, METHOD, AND COMPUTER PROGRAM PRODUCT FOR MEMORY MANAGEMENT", filed Feb. 20, 2003, Marco Zandonadi, et al. inventors; and co-pending U.S. patent application Ser. No. 10/371,681, entitled, "SYSTEM, METHOD, AND COMPUTER PROGRAM PRODUCT FOR PROCESSING REFLECTIVE STATE MACHINES", filed Feb. 20, 2003, Marco Zandonadi, et al. inventors; each of which is hereby incorporated by reference.

FIELD OF THE INVENTION

The present invention relates to the field of operating systems and more particularly to a structure, method, algorithm, and program shared memory queue.

BACKGROUND OF THE INVENTION

Many techniques for supporting network processing are known. Such techniques include generic memory management, interrupt scheduling, state machines, computer program code generation, and multi-protocol interfaces. The foundations of such processes are generally understood but in many cases their practical realization has fallen short of the desired results or they are incapable of providing the desired results.

Today many computer programs are intended to be processed in multi-processor and/or multi-threaded environments. The term processing is typically associated with executing a process (such as a computer program or set of computer instructions) and is generally considered to be an operating system concept that may include the computer program being executed and additional information such as specific operating system information. In some computing environments executing a computer program creates a new process to identify, support, and control execution of the computer program. Many operating systems, such as UNIX, are capable of running many processes at the same time using either a single processor and/or multiple processors. Multiple processors can perform tasks in parallel with one another, that is, a processor can execute multiple computer programs interactively, and/or execute multiple copies of the same computer program interactively. The advantages of such an environment includes a more efficient and faster execution of computer programs and the ability of a single computer to perform multiple tasks concurrently or in parallel.

A multiprocessor system, such as for example a network processor system, may include a number of system-on-chip components, that may be optimized for specific processing, such as for example optimized for processing packet input-output and packet modification. According to the one embodiment, a packet may include data, a packet destination address, and a packet sender address. Support for processing a high volume of packets may be provided by a multiprocessor system that requires improvements in common operating system functions. In part due to the high volume of packets, a multiprocessor system is particularly susceptible to inefficient processing techniques that may otherwise be effective with a single processor system.

Communication between computer programs typically includes the use of the buffer. A first computer program may request mutually exclusive access to the buffer and enqueue a communication. Subsequently, a second computer program may request mutually exclusive access to the buffer and dequeue the communication. Ideally, mutual exclusive access to the buffer and/or any buffer attributes are minimized to enhance the overall performance of the buffer. Unfortunately, conventional buffering systems provide mutual exclusive access to the buffer and any associated buffer attributes.

Therefore conventional processing of communication may not be efficient and there remains a need for a system, method, computer program, and computer program product for a shared memory queue in processing communications. What is needed is an ability to buffer communications without requiring unnecessary mutual exclusive access. Further, a need exists for an ability to further reduce the communication overhead associated with communication between two computer programs by eliminating any unnecessary mutual exclusive access, and that overcomes the above and other disadvantages of known communication processing.

BRIEF SUMMARY OF THE INVENTION

In summary, one aspect of the present invention is directed to a method for a shared memory queue to support communicating between computer processes, such as an enqueuing process and a dequeuing process. A buffer may be allocated including at least one element having a data field and a reserve field, a head pointer and a tail pointer. The enqueuing process may enqueue a communication into the buffer using mutual exclusive access to the element identified by the head pointer. The dequeuing process may dequeue a communication from the buffer using mutual exclusive access to the element identified by the tail pointer. Mutual exclusive access to said head pointer and tail pointer is not required. A system and computer program for a shared memory queue are also disclosed.

The system, method, and computer program product for shared memory queue of the present invention has other features and advantages which will be apparent from or are set forth in more detail in the accompanying drawings, which are incorporated in and form a part of this specification, and the following Detailed Description, which together serve to explain the principles of the present invention.

DETAILED DESCRIPTION

Reference will now be made in detail to embodiments of the invention, examples of which are illustrated in the accompanying drawings. While the invention will be described in conjunction with several embodiments, it will be understood that they are not intended to limit the invention to those embodiments. On the contrary, the invention is intended to cover alternatives, modifications and equivalents, which may be included within the spirit and scope of the invention as defined by the appended claims.

Several of the inventive systems, methods, and computer program, and computer program products for shared memory queue to support communication may be implemented for use with network processor (NP) platforms, such as for example a Teja Network Processor platform. References to "Teja" are references to particular embodiments, computer programming code segments, or other references to subject matter developed by Teja Technologies of San Jose, Calif.

According to one embodiment, the present invention provides innovative operating system techniques for network processing designed and implemented for network processors. In many conventional implementations, network processors are multiprocessor system-on-chip components optimized for packet input-output and modification. Network processors typically include a tightly coupled multiprocessor architecture. Advantageously, the present invention is capable of enhancing packet throughput and minimizing latency through the use of novel computer program software techniques for common operating system functions, and associated architectures and operating system methodologies according to an embodiment of the present invention.

Figure 1:
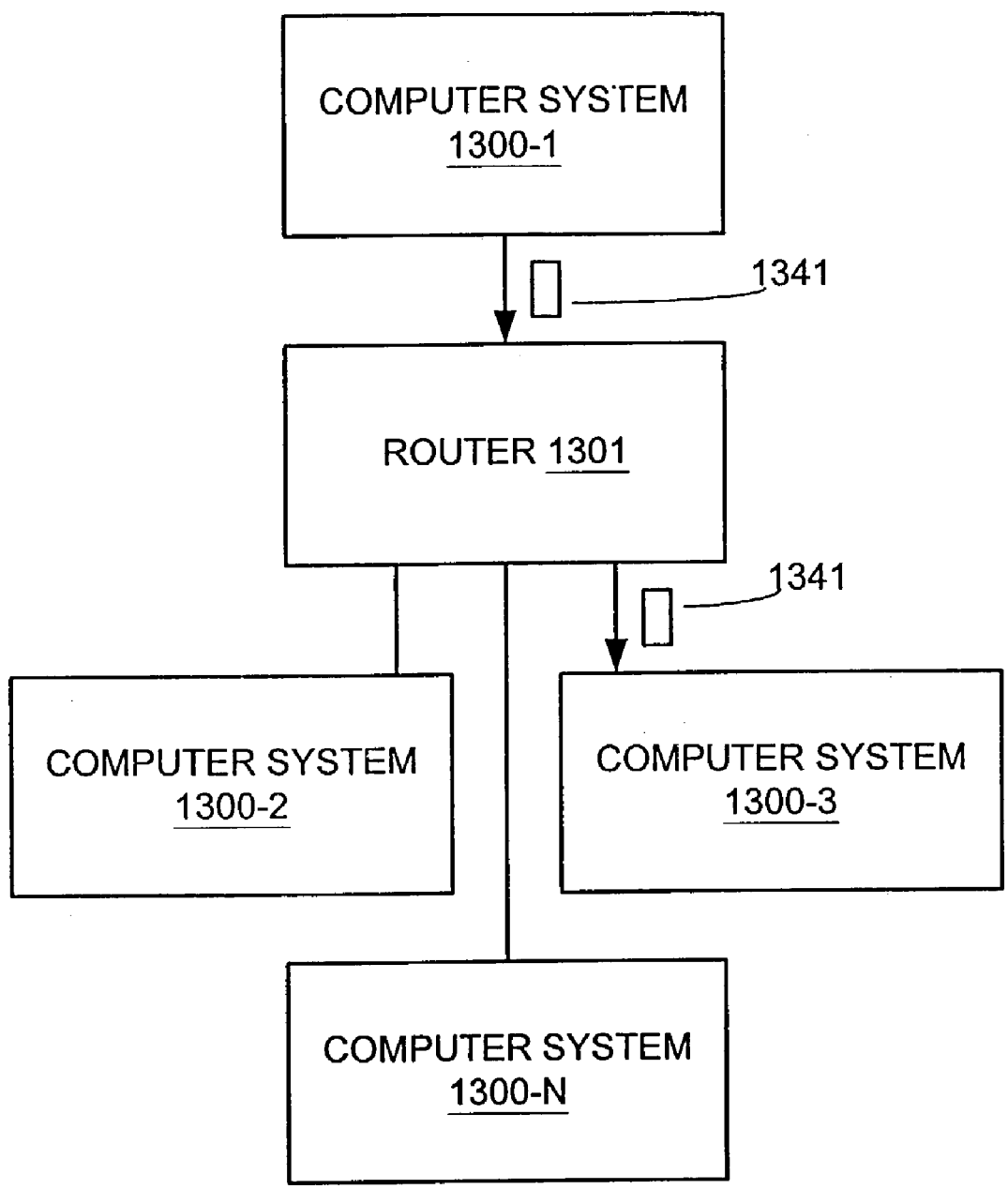
FIG. 1 generally illustrates a router receiving and forwarding a packet, according to the prior art.

Turning now to the drawings, wherein like components are designated by like reference numerals throughout the various figures, attention is directed to FIG. 1 illustrating a conventional router 1301 coupled between multiple computer systems 1300-$x$ (for example, computer systems 1300-1, 1300-2, 1300-3, . . . , 1300-N). Communication between multiple computers systems 1300-$x$ may use the router 1301 to route a packet of information 1341, or more simply a packet 1341, between computer systems. As illustrated, computer system 1300-1 may send a packet 1341 to the computer system 1300-3 through the router 1301. The router 1301 typically receives the packet 1341, analyzes the packet to determine where to forward the packet, and then, as illustrated, forwards the packet to the destination computer system 1300-3.

Figure 2:
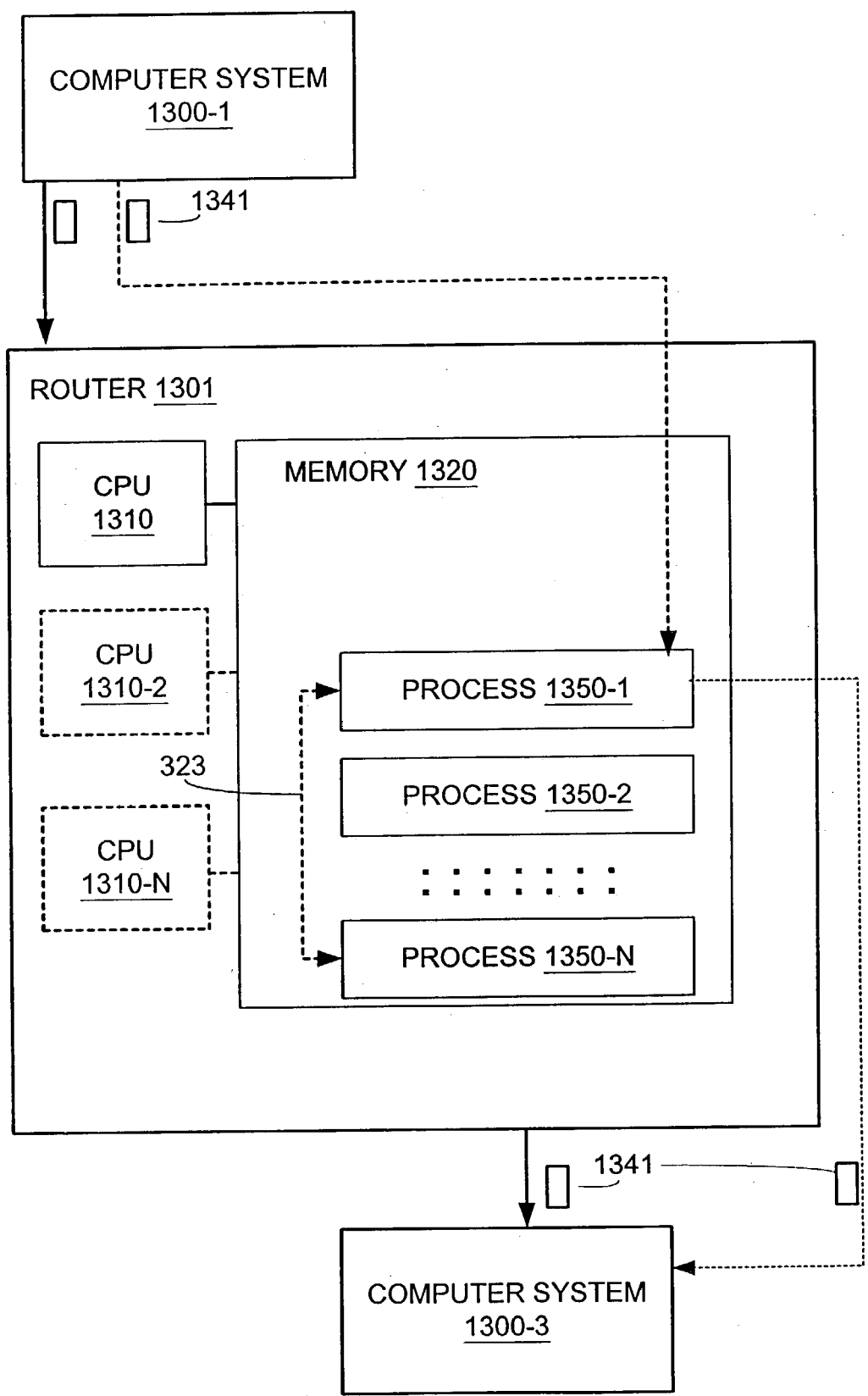
FIG. 2 generally illustrates a router including a CPU and memory for receiving and forwarding a packet, according to the prior art.

As illustrated in FIG. 2, the conventional router 1301 may include a CPU 1310 coupled with memory 1320. The memory 1320 may be coupled with one or more process 1350-$x$ (for example, process 1350-1, 1350-2, . . . , 1350-N). Each of the process may communicate with another process, such as for example process 1350-1 may communicate with process 1350-N. A process may include instructions for performing a particular activity or function, such as for example a function for receiving packet 1341, determining the destination address of the received packet 1341, and forwarding the packet 1341 to the determined destination address. The CPU 1310 may execute instructions associated with each process 1350-$x$. Further, communication between processes is typically supported using a communication link 323, such as for example communication between process 1350-1 and 1350-N. Other of the processes 1350-$x$ may be similarly coupled with the communication link 323. Communication may be provided through the use of queues that require mutual exclusive access to the entire queue. Unfortunately, communications are typically restricted by unnecessary processing associated with mutual exclusive access to the entire queue, such as for example a buffer and a set of pointers coupled with the buffer.

Figure 3:
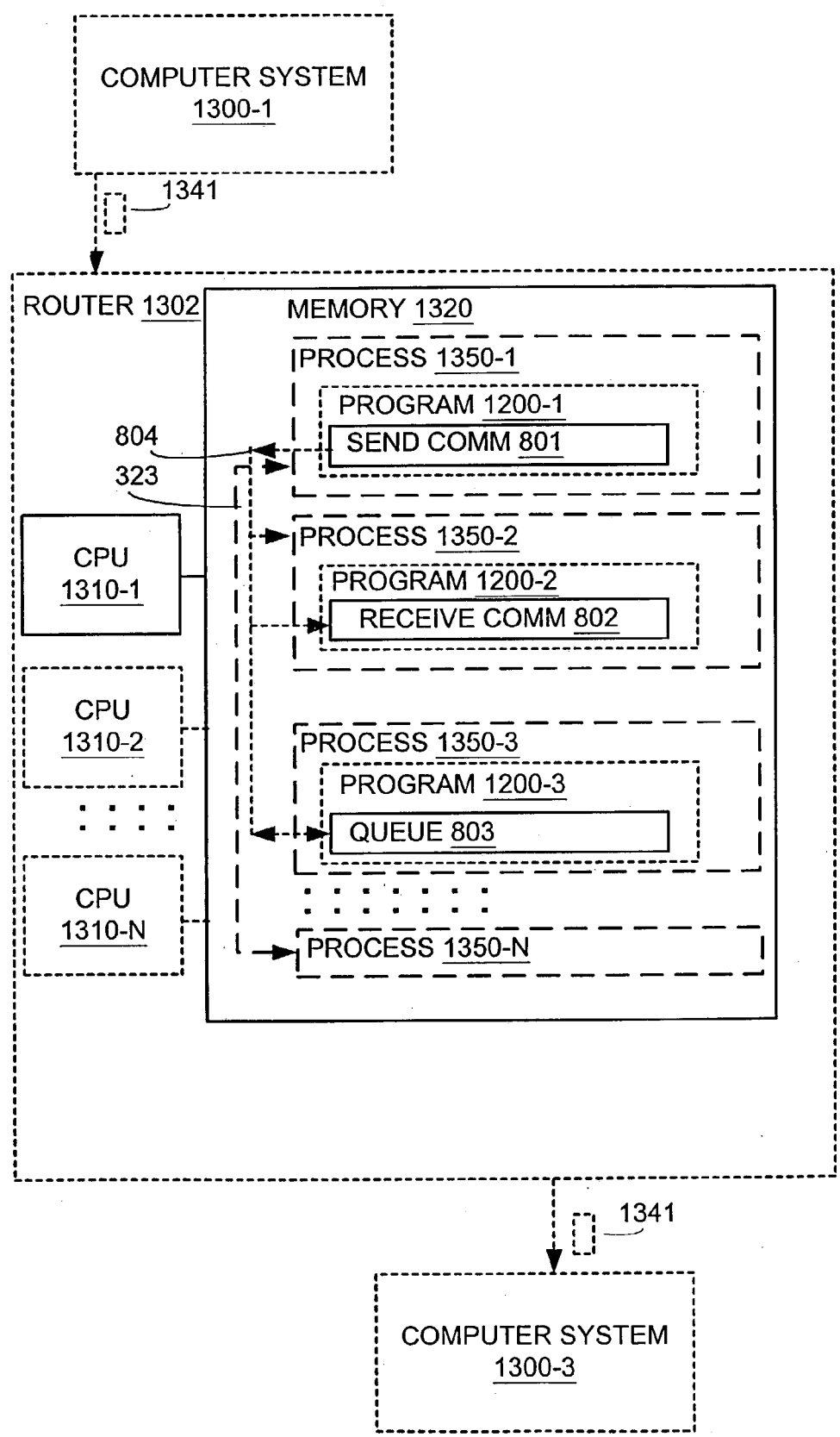
FIG. 3 generally illustrates a router including a CPU and memory for receiving and forwarding a packet with communication between processes, according to an embodiment of the present invention.

Advantageously, the present invention enhances performance by supporting communication between processes and/or computer programs while requiring minimal mutual exclusive access. FIG. 3 illustrates an innovative router, generally designated 1302. The innovative router 1302 may include one or more computer programs 1200 coupled with one or more processes 1350-$x$. A computer program 1200 may be used to receive the packet 1341, communicate with other processes in support of processing the packet 1341, and/or to send a corresponding packet 1341 to the computer system 1300-3.

Communication between processes 1350-x and/or programs 1200-x may be supported by the communication link 323 and/or a memory communication link 804. According to one embodiment, a sender may be or include either a computer program 1200 or a process 1350-x, and a receiver may be or include either a computer program 1200 or a process 1350-x. A computer program may initiate a send communication function 801 to be received by the receive communication function 802. The queue 803 may enqueue the communication from the send communication function 801 and make communication available for dequeuing by the receive communication function 802.

In one embodiment, the queue 803 is stored in a common memory and the memory communication link 804 supports access to the queue 803 by both the send communication function 801 and the receive communication function 802. Advantageously, communication between processes and/or computer program can be enhanced by using a common memory 1320 for the queue 803.

Figure 4:
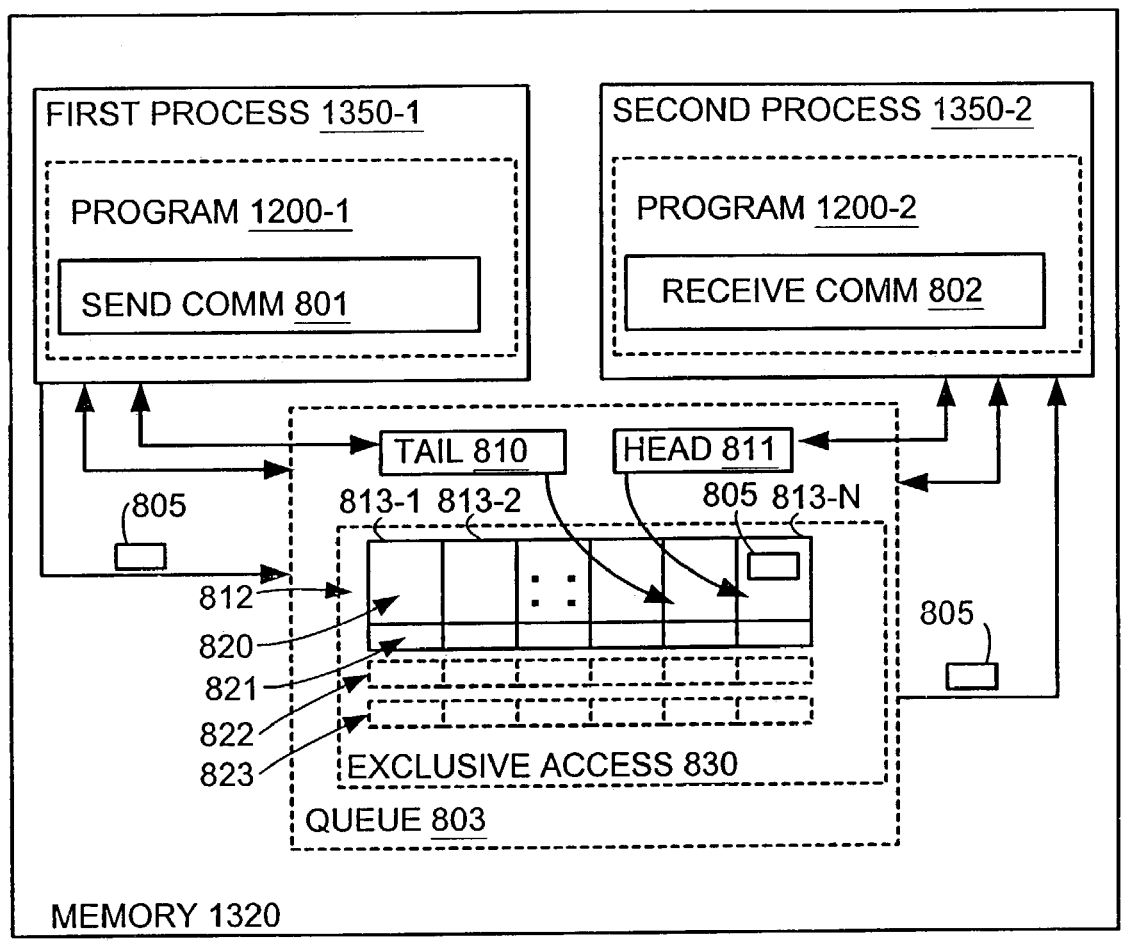
FIG. 4 generally illustrates communication and processing, according to an embodiment of the present invention.

FIG. 4 generally illustrates communication between two processes, including a first process 1350-1, a second process 1350-2 using the queue 803, according to an embodiment of the present invention. The send communication function 801 sends a communication to the receive communication function 802 using the queue 803. The send communication function 801 may send communication 805 for coupling with the queue 803. Subsequently the receive communication function 802 can receive the communication coupled with the queue 803.

The queue 803 is coupled with a memory 1320 that is accessible by both the first process 1350-1 and the second process 1350-2. The queue 803 includes a buffer 812, a tail pointer 810, and a head pointer 811. Mutual exclusive access 830 is provided for the buffer 812. The buffer 812 includes at least one element 813-x (such as for example, element 813-1, 813-2, . . . , 813-N). The element 813-x includes a data field 820 and a reserve field 821. The tail pointer 810 is coupled with a element 813-x, such as 813-1, to identify where the next communication may be enqueued. The head pointer 811 is coupled with a element 813-x, such as 813-N, to identify where the next communication may be dequeued from. Advantageously, the present invention does not require mutual exclusive access for either the tail pointer 810 or the head pointer 811.

According to one embodiment of the present invention, the data field 820 is used to store the communication 805. Alternatively, the data field 820 may be used to identify a communication 805, such as for example storing a pointer that is coupled with the communication 805.

According to one embodiment of the present invention, the reserve field 821 may be selected from a group of statuses consisting of an available status and a reserved status. Other embodiments may provide for different structures. An available status indicates the corresponding element 813-x is not coupled with a communication 805. If the tail pointer 810 is coupled with an element 813-x with an available status then a communication 805 may be enqueued with the element 813-x and the reserve field may be updated to the reserved status. The reserved status indicates the corresponding element 813-x is coupled with a communication 805. If the head pointer 810 is coupled with an element 813-x with a reserved status then a communication may be dequeued from to the element 813-x and the reserve field may be updated to the available status. If the head pointer 810 is coupled with an element 813-x with an available status then the queue may be empty.

According to one embodiment of the present invention, mutual exclusive access to the reserve field and data field of an element 813-x can ensure the integrity of a communication. Advantageously, the shared memory queue does not require mutual exclusive access to either the head pointer 811 or the tail pointer 810.

According to one embodiment of the present invention, an enqueuing status 822 may be coupled with each element 813-x to indicate the successful completion of enqueuing a communication coupled with an element 813-x. According to another embodiment of the present invention, a dequeuing status 823 may be coupled with each element 813-x to indicate the successful completion of dequeuing a communication coupled with an element 813-x. The enqueuing status 822 and the dequeuing status 823 may also be combined into one status.

Figure 5:
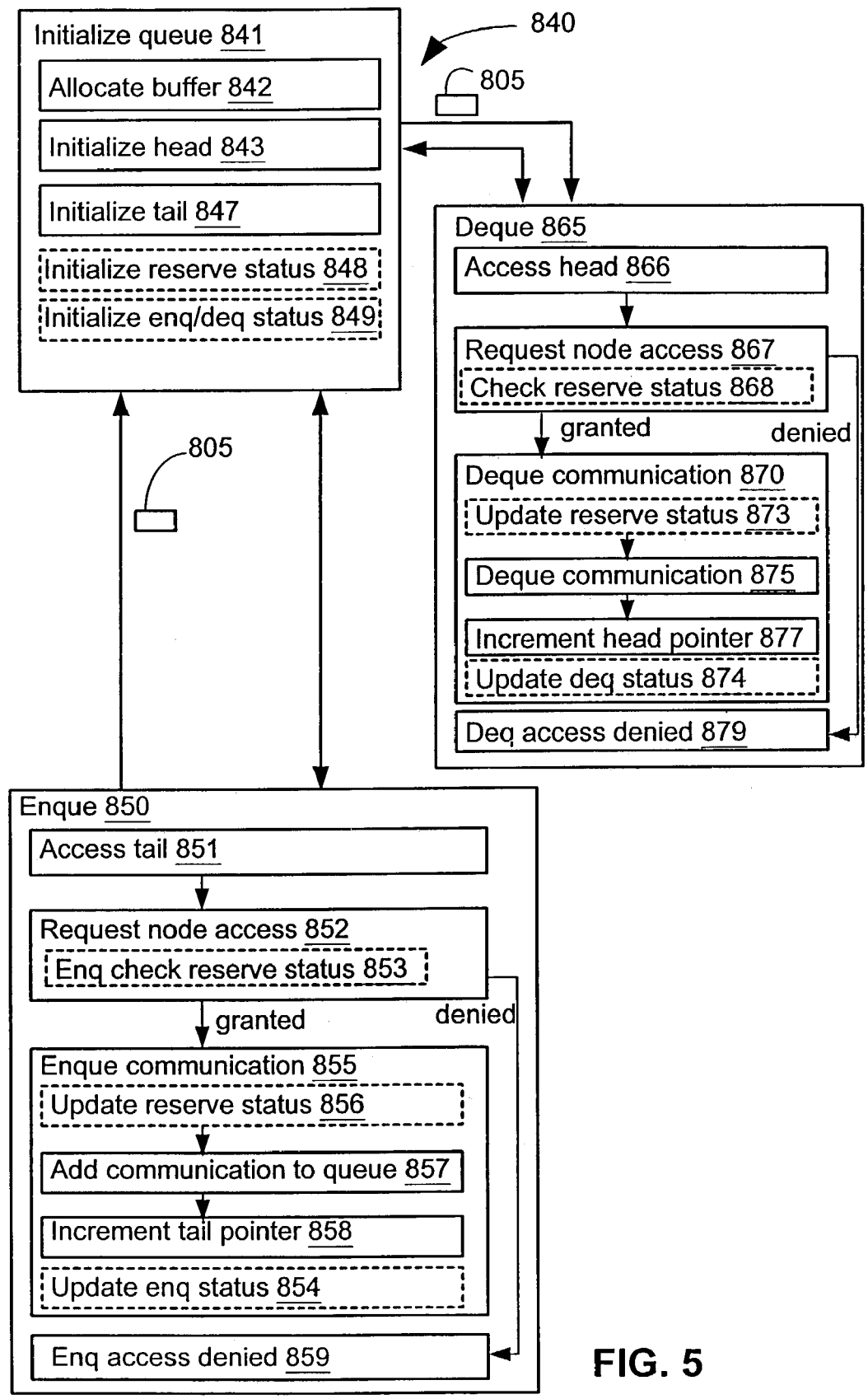
FIG. 5 generally illustrates a method for processing a communication, according to an embodiment of the present invention.

FIG. 5 generally illustrates an embodiment of a method for communication 840 using a shared memory queue including initializing a queue 841, enqueuing the communication at 850, and dequeuing a communication at 865, according to one embodiment of the present invention. Initialization of the queue at 841 may be performed by a process 1350-x and/or a computer program 1200-x. Allocating the buffer 812 at 842 includes allocating at least one element 813-x. Each element 813-x typically includes a data field 820 and a reserve field 821. The head pointer 811 may be initialized at 843 to an element 813-x allocated at 842. The tail pointer 810 may be initialized at 847 to an element 813-x allocated at 842. Both the tail pointer 810 and the head pointer 811 may be initialized to point to the same element 813-x. The reserve field 821 coupled with each element 813-x may be initialized at 848 to indicate the element is available. Optionally, the enqueuing status 822 may be initialized at 849 to indicate that a communication is not currently being enqueued with the corresponding element 813-x. Optionally, the dequeuing status 823 may be initialized at 849 to indicate that a communication is not currently being dequeued from the corresponding element 813-x.

A method of enqueuing a communication at 850 may be performed by the send communication function 801 and typically includes accessing the tail pointer 810 at 851, requesting an element 813-x access at 852, and enqueuing the communication 805 at 855 if the access request at 852 was granted, and not enqueuing the communication 805 at 859 if the access request at 852 was denied. According to the present invention, mutual exclusive access to the tail pointer 810 is not provided. Consequently multiple computer programs 1200-x and/or multiple processes 1350-x may have simultaneous access to the tail pointer 810. Advantageously, the present invention does not require mutual exclusive access to the tail pointer 810.

According to one embodiment of the present invention, enqueuing a communication 805 at 850 includes accessing the tail pointer at 851, requesting element access at 852, and enqueuing at 855. Typically, the request element access at 852 checks the reserve field 821 at 853 to determine if the corresponding element is available. If the element 813-x is available then access is granted and the communication 805 may be enqueued at 855.

Enqueuing a communication 805 at 855 may include updating the reserve field 821 at 856 to indicate the element 813-x is available for dequeuing. The communication 805 may be coupled with the element 813-x at 857. Mutually exclusive access 830 may be provided for the updating the reserve field and/or enqueuing the communication at 857.

Ideally, updating the reserve field at 856 and enqueuing the communication at 857 may be performed using mutual exclusive access to the element 813-*x*. According to one embodiment updating the element 813-*x* is performed using mutual exclusive access to the element. According to another embodiment of the present invention, a so-called test-and-set capability is used to perform the request element access at 852, update the reserve field at 856, and add the communication to the queue at 857. A test-and-set capability is a known implementation for supporting mutual exclusive access and not described in further detail here.

The tail pointer 810 may be incremented at 858 to point to the next element in the group of elements 813-*x*. According to one embodiment of the present invention, the tail pointer 810 may be incremented at 858 before updating the reserve field at 856 and/or adding the communication 805 to the queue at 857.

According to yet another embodiment of the present invention, while enqueuing a communication at 855 the enqueuing status 822 may be set at 854 to indicate the communication 805 is currently be coupled with the element 813-*x* at 857. After the communication 805 has been coupled with the element 813-*x* at 857 then the update enqueuing status at 854 may be performed again to indicate coupling the communication 805 with the element 813-*x* at 857 was completed. Advantageously, the communication 805 may be coupled with the buffer 812 without having a limitation on the size of the communication 805.

If request access at 852 was denied then the communication 805 can not be enqueued in the buffer 812. Several possible reasons for denial of the requested access at 852 may include the buffer 812 is full and/or the element 813-*x* coupled with the tail pointer 810 is currently used by another send communication function 801.

A method of dequeuing a communication at 865 may be performed by the receive communication function 802 and typically includes accessing the head pointer 811 at 866, requesting an element 813-*x* access at 867, and dequeuing the communication 805 at 870 if the access request at 867 was granted, and not dequeuing the communication 805 at 879 if the access request at 867 was denied. According to the present invention, mutual exclusive access to the head pointer 811 is not provided. Consequently multiple programs 1200-*x* and/or multiple processes 1350-*x* may have simultaneous access to the head pointer 811. Advantageously, the present invention does not require mutual exclusive access to the head pointer 811.

According to one embodiment of the present invention, dequeuing a communication 805 at 870 includes accessing the head pointer at 866, requesting element access at 867, and dequeuing at 870. Typically, the request element access at 867 checks the reserve field 821 at 868 to determine if the corresponding element is reserved. If the element 813-*x* is reserved then access is granted and the communication 805 may be dequeued at 870.

Dequeuing a communication 805 at 870 may include updating the reserve field 821 at 873 to indicate the element 813-*x* is currently available for enqueuing another communication. The communication 805 may be decoupled from the element 813-*x* at 875. Mutually exclusive access 830 may be provided for the updating the reserve field and/or dequeuing the communication at 875. Ideally, updating the reserve field at 873 and dequeuing the communication at 875 may be performed using mutual exclusive access to the element 813-*x*. According to one embodiment dequeuing the element 813-*x* is performed using mutual exclusive access to the element. According to another embodiment of the present invention, a so-called test-and-set capability is used to perform the request element access at 867, update the reserve field at 873, and dequeue the communication from the queue at 875.

The head pointer 811 may be incremented at 877 to point to the next element in the group of elements 813-*x*. According to one embodiment of the present invention, the head pointer 810 may be incremented at 877 before updating the reserve field at 873 and/or dequeuing the communication 805 from the queue at 875.

According to yet another embodiment of the present invention, while dequeuing a communication at 855 the dequeuing status 823 may be set at 874 to indicate the communication 805 is currently being decoupled from the element 813-*x* at 875. After the communication 805 has been decoupled from the element 813-*x* at 875 then the update dequeuing status at 874 may be performed again to indicate decoupling the communication 805 from the element 813-*x* at 875 was completed. Advantageously, the communication 805 may be decoupled from the buffer 812 without having a limitation on the size of the communication 805.

If request access at 867 was denied then the communication 805 can not be dequeued from the buffer 812. Several possible reasons for denial of the requested access at 867 may include the buffer is empty and/or the element 813-*x* coupled with the head pointer 811 is currently used by another receive communication function 802.

According to one embodiment of the present invention, the buffer 812 may be defined by an ordered set of elements 813-*x*. Initially, the tail pointer 810 and head pointer 811 may point to the same element 813-*x*, such as for example element 813-1. The reserve field may be initialized to an available status at 848 for each of the elements 813-*x*. An initial attempt to dequeue the communication at 865 may result in access denied because the reserve field was initialized to an available state and thereby indicates that no communication 805 has been previously queued. An initial attempt to enqueue a communication 850 would result in access granted because the reserve field indicates an available status. According to one embodiment of the present invention, the ordered set of elements 813-*x* is a circular set and/or list of elements 813-*x*.

One or more of a variety of queue types may be used to implement the queue 803. According to one embodiment of the present invention, the queue is a first-in and first-out queue (FIFO). A FIFO queue provides that the first communication enqueued in the queue is the first communication dequeued from the queue. According to one embodiment of the present invention, the buffer 812 may be implemented as a set of elements, with a tail pointer and a head pointer. A communication 805 may be enqueued to a tail and dequeued from the head. A circular buffer may be used to represent set of elements.

According to one embodiment of the present invention, each element 813-*x* coupled with the buffer 812 may be defined as N-bits. For each N-bit element (such as for example, a 32-bit element, a 64-bit element, or 128-bit element), one bit may be reserved to identified the reserve field 821. The remaining bits may define the data field and/or to couple a communication 805 with the element 813-*x*. Typically, each element 813-*x* is of a uniform size, such as for example, a 32-bit element.

According to one embodiment of the present invention, the head pointer 811 and the tail pointer 800 may be stored in a computer register coupled with a CPU and/or in a computer memory 1320. The use of a computer register may be advantageous in a so-called multithreaded processors environment, such as for example a UNIX operating system and/or a real time embedded system. The head pointer 811 and the tail pointer 800 may be stored in a computer memory 1320 that is accessible to multiple processors may be advantageous in a so-called parallel processing computer system.

According to one embodiment, the term element is synonymous with the term node.

According to one embodiment of the present invention, the queue consists of a head pointer, a tail pointer, and an array of elements. An element consists of a data field and a reservation field. The head and tail pointer are both initialized to a first element within the array of elements. A dequeue is performed by locking an element identified by the head pointer, and reading the element pointed to by the head pointer. If the dequeue finds the reserve field is set to unavailable, the data field is returned, the reserved field is set to available, and the head pointer is set to point to the next element and then the element is unlocked. If the dequeue finds the reserved field is set to available, the element is unlocked. An enqueue is done by locking an element identified by the tail pointer, and reading the element pointed to by the tail pointer. If the enqueue finds the reserved field is set to unavailable, the data field is written, the reserved field is set to unavailable, and the tail pointer is set to the next element and then the element is unlocked. If the enqueue finds the reserved field is set to available, the element is unlocked.

Figure 6:
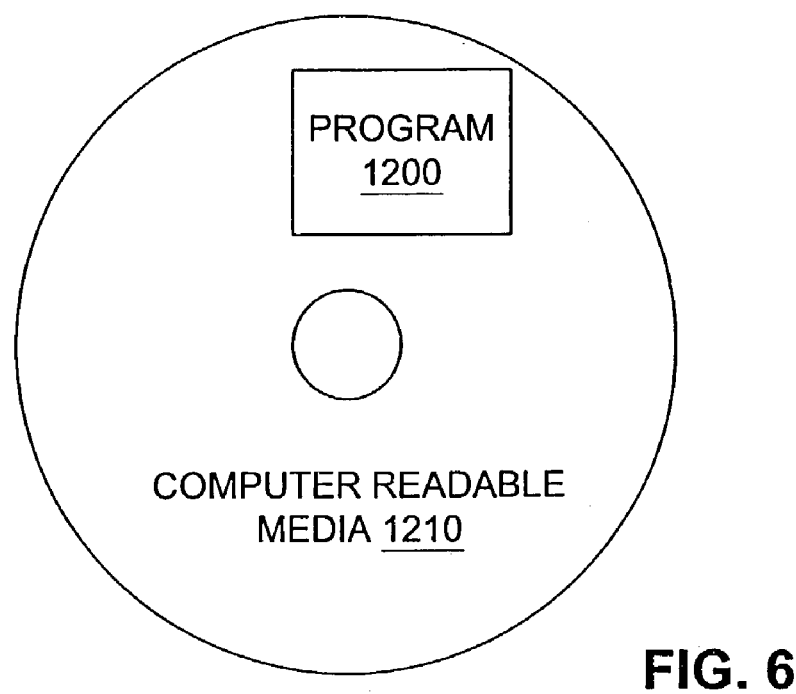
FIG. 6 illustrates an embodiment of a method implemented on a computer readable media, according to an embodiment of the present invention.

FIG. 6 illustrates an exemplary method according to the present invention in the form of a computer program stored or defined on a computer readable media 1210. A computer program 1200 and computer program product represents at least one of the methods described herein, such as for translation processing 450. The computer program 1200 is coupled with or stored in a computer readable media 1210, such that a computer system can read and execute the computer program 1200.

Figure 7:
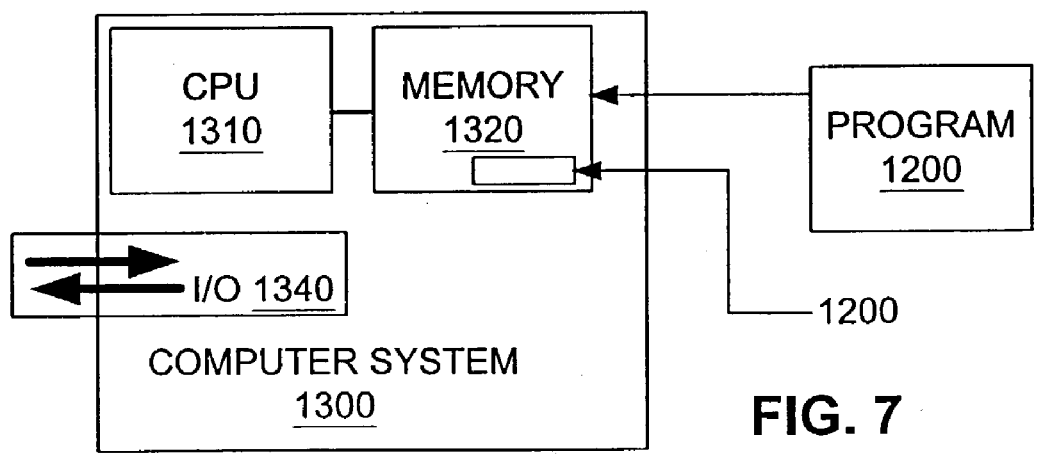
FIG. 7 illustrates an embodiment of a method executed by a computer system, according to an embodiment of the present invention.

FIG. 7 illustrates an exemplary computer system 1300 including at least one processor or central processing unit (CPU) 1310, a memory 1320 coupled to the CPU 1310, and support for input and output 1340. The computer program 1200 may be loaded into a memory 1320 accessible to the computer system 1300, which is capable of executing the computer program 1200. Alternatively, the computer program 1200 may be permanently embedded in the memory 1320 or partially embedded and partially loaded into memory. The support for input and output 1340 typically interacts with the computer program 1200.

Advantageously, the present invention enhances performance by supporting communication between processes and/or computer programs thereby providing a more efficient utilization of resources. Further, communication between computer processes and/or computer programs without requiring unnecessary mutual exclusive access is more efficient.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the claims appended hereto and their equivalents.

What is claimed is:

1. A method to support communication including:
   (A) allocating a buffer having at least one buffer element, the allocating including:
      (a) allocating at least one buffer element having a data field and a reserve field;
      (b) allocating a head pointer coupled with a buffer head element, the buffer head element being selected from said at least one buffer element; and
      (c) allocating a tail pointer coupled with a buffer tail element, the buffer tail element being selected from said at least one buffer element;
   (B) enqueuing a communication into said buffer with mutual exclusive access to said head element and without mutual exclusive access to either of said head pointer and said tail pointer; and
   (C) dequeing a communication from said buffer with a mutual exclusive access to said tail element and without mutual exclusive access to either of said head pointer and said tail pointer.

2. The method of claim 1, wherein said reserve field identifies a reserve status selected from a group of statuses consisting of an available status and a reserved status.

3. The method of claim 2, wherein said reserve field is initialized with a default value of said available status.

4. The method of claim 1, wherein said buffer (A) is used to communicate between a plurality of said least one computer process.

5. The method of claim 1, wherein said element of (a) is N bits, wherein N−1 bits are used for said data field and 1 bit is used for said reserve field.

6. The method of claim 1, wherein said element at (a) is represented in 32 bits, including 31 bits for said data field and 1 bit for said reserve field.

7. The method of claim 1, wherein said head pointer at (b) and said tail pointer at (c) are both initially coupled with a first element of said at least one element.

8. The method of claim 1, wherein said mutual exclusive access to said element is provided by a test-and-set capability.

9. The method of claim 1, wherein said the tail pointer is stored at a first register and said head pointer is stored at a second register.

10. The method of claim 1, wherein:
   said reserve field identifies a reserve status selected from a group of statuses consisting of an available status and a reserved status;
   said enqueuing at (B) further comprises:
   if said tail element corresponds to a reserve status identifying said available status then: (i) updating said reserve status to said reserved status, (ii) enqueuing said communication to said data field corresponding to said tail element, (iii) updating said tail pointer, after said enqueuing, to a next element in said at least one element; and (iv) indicating an enqueuing success; and otherwise indicating an enqueuing failure; and
   said dequeuing at (C) further comprises:
   if said head element corresponds to a reserve status identifying said reserved status then: (i) dequeuing said data field corresponding to said head element and updating said reserve status to said available status, (ii) updating said head pointer, after said dequeuing, to a next element in said at least one element; and (iii) indicating a dequeuing success;
   and otherwise indicating a dequeuing failure.

11. A method to support communication including:
(A) allocating a buffer including:
  (a) allocating at least one element having a data field and a reserve field, said reserve field identifies a reserve status selected from a group of statuses consisting of an available status and a reserved status;
  (b) allocating a head pointer coupled with a head element selected from said at least one element;
  (c) allocating a tail pointer coupled with a tail element selected from said at least one element;
(B) enqueuing a communication into said buffer with mutual exclusive access to said head element and without mutual exclusive access to said head pointer or said tail pointer; and
(C) dequeing a communication from said buffer with a mutual exclusive access to said tail element and without mutual exclusive access to said head pointer or said tail pointer; and
wherein said enqueuing at (B) further comprises:
if said tail element corresponds to a reserve status identifying said available status then;
updating said reserve status to said reserved status,
enqueuing said communication to said data field corresponding to said tail element,
updating said tail pointer, after said enqueuing, to a next element in said at least one element; and
indicating an enqueuing success; and
otherwise indicating an enqueuing failure.

12. The method of claim 11, wherein said allocating at (a) further comprises each of said at least one element further having an enqueuing field identifying a enqueuing status selected from a group of statuses consisting of: an enqueuing success status and an enqueuing failure status, and said enqueuing at (B) further comprises indicating said enqueuing success using said enqueuing success status and indicating said enqueuing failure using said enqueuing failure status.

13. A method to support communication including:
(A) allocating a buffer including:
  (a) allocating at least one element having a data field and a reserve field, said reserve field identifies a reserve status selected from a group of statuses consisting of an available status and a reserved status;
  (b) allocating a head pointer coupled with a head element selected from said at least one element;
  (c) allocating a tail pointer coupled with a tail element selected from said at least one element;
(B) enqueuing a communication into said buffer with mutual exclusive access to said head element and without mutual exclusive access to said head pointer or said tail pointer; and
(C) dequeing a communication from said buffer with a mutual exclusive access to said tail element and without mutual exclusive access to said head pointer or said tail pointer; and
wherein said dequeuing at (C) further comprises:
if said head element corresponds to a reserve status identifying said reserved status then:
dequeuing said data field corresponding to said head element and updating said reserve status to said available status;
updating said head pointer, after said dequeuing, to a next element in said at least one element; and
indicating a dequeuing success; and
otherwise indicating a dequeuing failure.

14. The method of claim 13, wherein said allocating at (a) further comprises each of said at least one element further having a dequeuing field identifying a dequeuing status selected from a group of statuses consisting of: a dequeuing success status and a dequeuing failure status, and said dequeuing at (C) further comprises indicating said dequeuing success using said dequeuing success status and indicating said dequeuing failure using said dequeuing failure status.

15. A method to support communication between a plurality of computer processes, the method including:
(A) allocating a buffer including:
  (a) allocating at least one element of the buffer having a data field and a reserve field, said reserve field identifies a reserve status selected from a group of statuses consisting of an available status and a reserved status, said reserve field is initialized with a default value of said available status, said element is allocated in N bits, wherein N−1 bits represents said data field and 1 bit represents said reserve field;
  (b) allocating a head pointer coupled with a head element selected from said at least one element, and
  (c) allocating a tail pointer coupled with one a tail element selected from said at least one element;
(B) enqueuing a communication into said buffer with mutual exclusive access to said head element and without mutual exclusive access to either of said head pointer and said tail pointer; and
(C) dequeuing a communication from said buffer with mutual exclusive access to said tail element and without mutual exclusive access to either of said head pointer and said tail pointer.

16. The method of claim 15, wherein said mutual exclusive access is provided by a test-and-set capability.

17. The method of claim 16, wherein said tail pointer is stored at a first register and said head pointer is stored at a second register.

18. A method to support communication between a plurality of computer processes, the method including:
(A) allocating a buffer including:
  (a) allocating at least one element having a data field and a reserve field, said reserve field identifies a reserve status selected from a group of statuses consisting of an available status and a reserved status, said reserve field is initialized with a default value of said available status, said element is allocated in N bits, wherein N−1 bits represents said data field and 1 bit represents said reserve field;
  (b) allocating a head pointer coupled with a head element selected from said at least one element, and
  (c) allocating a tail pointer coupled with one a tail element selected from said at least one element;
  said tail pointer is stored at a first register and said head pointer is stored at a second register;
(B) enqueuing a communication into said buffer with mutual exclusive access to said head element and without mutual exclusive access to said head pointer or said tail pointer; and
(C) dequeuing a communication from said buffer with mutual exclusive access to said tail element and without mutual exclusive access to said head pointer or said tail pointer;
said mutual exclusive access is provided by a test-and-set capability; and
said enqueuing at (B) further comprises:
if said tail element corresponds to a reserve status identifying said available status then:

updating said reserve status to said reserved status, enqueuing said communication to said data field corresponding to said tail element, incrementing said tail pointer, after said enqueuing, to a next element of said at least one element; and indicating an enqueuing success; and otherwise indicating an enqueuing failure.

19. The method of claim 18, wherein said allocating at (a) further comprises each of said at least one element further having an enqueuing field identifying an enqueuing status selected from a group of statuses consisting of an enqueuing success status and an enqueuing failure status, and said enqueuing at (B) further comprises indicating said enqueuing success using said enqueuing success status and indicating said enqueuing failure using said enqueuing failure status.

20. A computer-readable medium comprising a computer program to cause a processor to process communication to support communicating between at least one computer process, including a enqueuing process and a dequeuing process by:

(A) allocating a buffer including:
 (a) allocating at least one element of the buffer having a data field and a reserve field;
 (b) allocating a head pointer coupled with a head element selected from said at least one element: and
 (c) allocating a tail pointer coupled with a tail element selected from said at least one element;

(B) executing said at least one first program instruction by said enqueuing process capable of enqueuing a communication into said buffer with mutual exclusive access to said head element and without mutual exclusive access to either of said head pointer and said tail pointer; and (C) executing said at least one second program instruction by said dequeuing process capable of dequeuing a communication from said buffer with mutual exclusive access to said tail element and without mutual exclusive access to either of said head pointer and said tail pointer.

21. A computer system comprising:

a computer-readable medium comprising a computer program for causing a processor to process communication to support communicating between at least one computer process, including a enqueuing process and a dequeuing process by:

(A) allocating a buffer including:
 (a) allocating at least one element of the buffer having a data field and a reserve field;
 (b) allocating a tail pointer coupled with a head element selected from said at least one element;
 (c) allocating a tail pointer coupled with a tail element selected from said at least one element;

(B) executing said at least one first program instruction by said enqueuing process capable of enqueuing a communication into said buffer with mutual exclusive access to said head element and without mutual exclusive access to either of said head pointer and said tail pointer; and (C) executing said at least one second program instruction by said dequeuing process capable of dequeuing a communication from said buffer with mutual exclusive access to said tail element and without mutual exclusive access to either of said head pointer and said tail pointer; and a CPU coupled to said medium, for executing said program therein.

22. A communication system, comprising:

a memory to store a plurality of computer programs executable by a computer processor;

an initialization function accessible by at least one computer process selected from said plurality of computer processes to allocate a buffer having at least one buffer element including:
 (a) allocating at least one element having a data field and a reserve field;
 (b) allocating a head pointer coupled with a head element selected from said at least one element; and
 (c) allocating a tail pointer coupled with tail element selected from said at least one element;

an enqueuing function accessible by at least one enqueuing computer process selected from said plurality of computer processes to enqueuing a communication with said buffer;

a dequeuing function accessible by at least one dequeuing computer process selected from said plurality of computer processes to dequeuing a communication from said buffer; and a mutual exclusive access function accessible by said enqueuing function and said dequeuing function, said mutual exclusive access function to provide mutual exclusive access to said element without requiring mutual exclusive access to said head pointer and said tail pointer, an initialization computer program selected from said plurality of computer programs coupled with said initialization function to allocate said buffer; and a first computer program selected from said plurality of computer programs coupled with said enqueuing function to enqueue a first communication; and a second computer program selected from said plurality of computer programs coupled with said dequeuing function and said interface to dequeue said first communication said second computer program.

23. A communication processing system, comprising:

means for coupling at least one computer process, including a enqueuing process and a dequeuing process with said processing system;

means for allocating a buffer including:
 means for allocating at least one element of the buffer having a data field and a reserve field;
 means for allocating a head pointer coupled with a head element selected from said at least one element; and
 means for allocating a tail pointer coupled with a tail element from said at least one element;

means for executing said at least one first program instruction by said enqueuing process capable of enqueuing a communication in said buffer with mutual exclusive access to said head element and without mutual exclusive access to either of said head pointer and said tail pointer; and means for executing said at least one second program instruction by said dequeuing process capable of dequeuing a communication from said buffer with mutual exclusive access to said tail element and without mutual exclusive access to either of said head pointer and said tail pointer.

24. The communication processing system of claim 23, further comprising:

means for communicating between a plurality of said at least one computer process, wherein said means for allocating at least one element further comprises allocating said element as N bits with N−1 bits for said data field and with 1 bit for said reserve field.

25. In a router capable of processing a packet using a plurality of processors with each processor capable of executing at least one process, a first process capable of executing a first processor executable program including at least one first computer program instruction, a second process capable of executing a second processor executable program including at least one second program instruction a method for communicating between said first process and said second process, the method comprising:
- (A) allocating a buffer including:
  - (a) allocating at least one buffer element having a data field and a reserve field, said reserve field selected from a group of statuses consisting of an available status and a reserved status;
  - (b) allocating a head pointer couplable with a head element selected from said at least one element; and
  - (c) allocating a tail pointer couplable with one a tail element selected from said at least one element; and
- (B) executing said at least one first program instruction capable of enqueuing a communication, said first program instruction capable of mutual exclusive access to said data field and said reserve field without mutual exclusive access to either of said head pointer and said tail pointer; and
- (C) executing said at least one second program instruction capable of dequeuing a communication sent at (B), said second program instruction capable of mutual exclusive access to said data field and said reserve field without mutual exclusive access to either of said head pointer and said tail pointer.

26. A method for a shared memory queue to support communication between a first process and a second process, the method including:
- (A) allocating a buffer having at least one buffer element, the allocating including:
  - (a) allocating the at least one buffer element having a data field and a reserve field;
  - (b) identifying one of said at least one buffer element from said at least one allocated buffer element as a buffer head element, and associating a head pointer separate from said buffer with said buffer head element;
  - (c) identifying one of said at least one buffer element from said at least one allocated buffer element as a buffer tail element, and associating a tail pointer separate from said buffer with said buffer tail element;
- (B) enqueuing a communication into said buffer with mutual exclusive access to said head element and without mutual exclusive access to either of said head pointer and said tail pointer; and
- (C) dequeing a communication from said buffer with a mutual exclusive access to said tail element and without mutual exclusive access to either of said head pointer and said tail pointer.

* * * * *